Sept. 19, 1939. J. D. TRAMMELL 2,173,792
PIPE JOINT
Filed April 5, 1938 3 Sheets-Sheet 1

Inventor
Jefferson D. Trammell
By Robert Craig Greene
Attorney

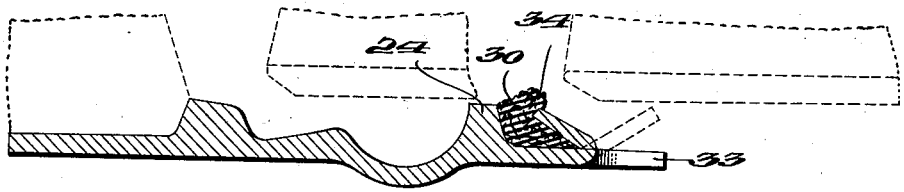
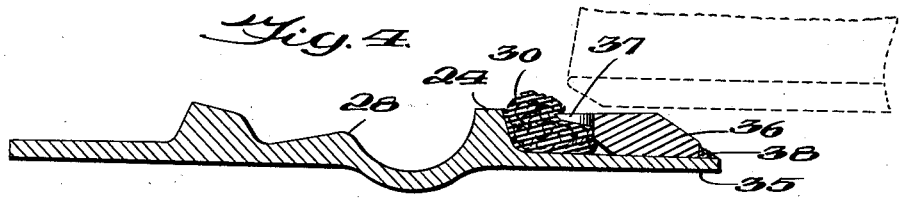
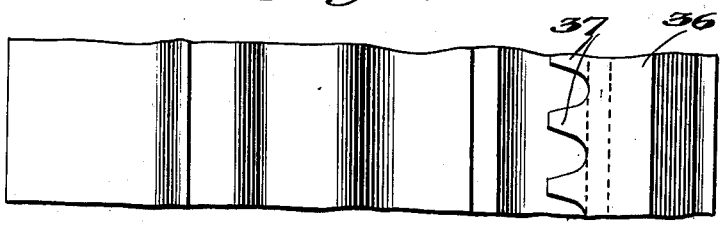
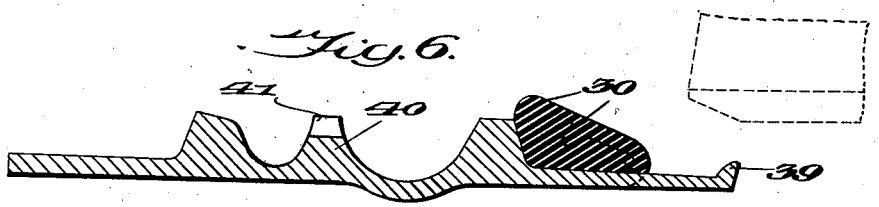
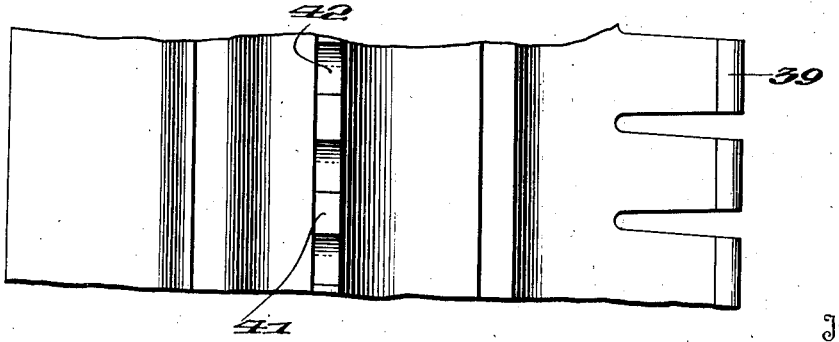

Sept. 19, 1939.    J. D. TRAMMELL    2,173,792
PIPE JOINT
Filed April 5, 1938    3 Sheets-Sheet 3

Inventor
J. D. Trammell
By Robert Craig Greene
Attorney

Patented Sept. 19, 1939

2,173,792

UNITED STATES PATENT OFFICE 2,173,792

PIPE JOINT

Jefferson D. Trammell, Fort Worth, Tex.

Application April 5, 1938, Serial No. 200,208

8 Claims. (Cl. 285—112)

My invention relates to reenforced concrete pipes and the sealing of expansion joints for the sections thereof, and provides an expansion joint having a smooth metallic surface on which one or more sealing rings may slip when the pipe as a whole tends to expand or contract due to both changes in temperature and variations of moisture contained in the concrete. My joint includes a relatively wide sealing ring which remains fluid tight during the expansion or contraction of the pipe as well as to other movements of the sections due to subsiding or to heaving of the pipe. By using lead, leadite or other similar permanent sealing material, there is no danger of the joint failing on account of the deterioration of my main sealing ring and should a defect be found in any of my joints, it may be calked to permanently stop the leakage. This not only expedites the repair of such accidental leakages but avoids the expense and delay which would necessarily follow the taking up and relaying of a plurality of pipe sections.

In the accompanying drawings, which are illustrative of my invention:

Figure 3 is an axial section of an alternative form of spigot facing;

Figure 4 is an axial section of an alternative form of spigot facing formed of two concentric parts;

Figure 5 is a plan view of a short piece of the spigot facing illustrated in Figure 4;

Figure 6 is an axial section of a further modification of the form illustrated in Figure 3;

Figure 7 is a plan view of a short piece of spigot facing illustrated in Figure 6;

Figure 1:
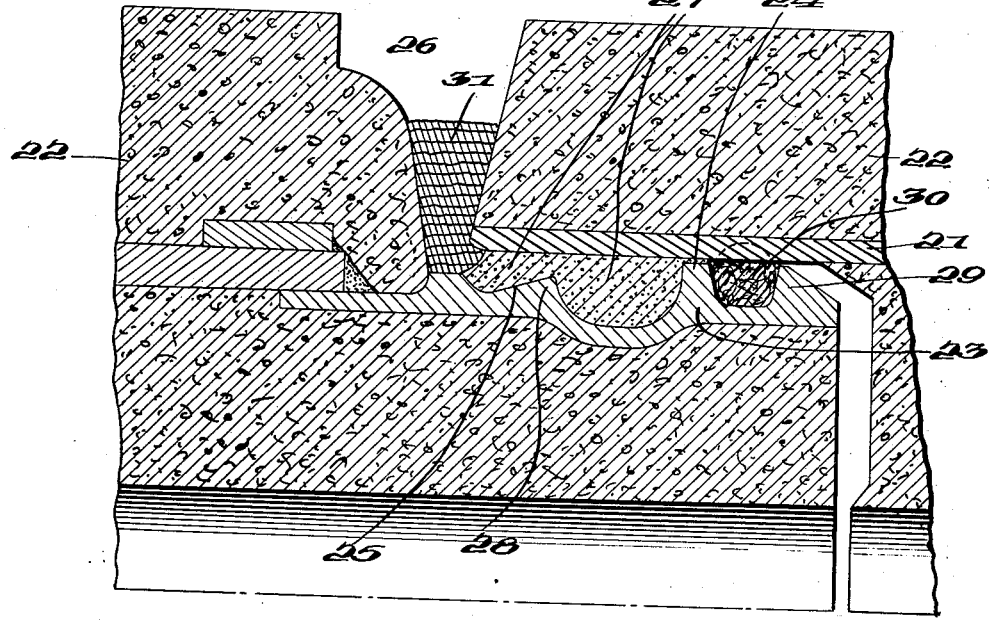
Figure 1 is an axial section of one form of my joint.

In these drawings, 21 represents a smooth cylindrical bell facing of a reinforced concrete pipe 22. A spigot facing 23 has a circumferential rib 24 adapted to bear against said bell, a circumferential groove 25 of varying depth is bounded on one side by said rib and is externally accessible through a circumferential groove 26 formed between adjacent pipe sections. A permanent watertight seal 27 of lead, leadite or the like fills the groove 25 and is preferably formed by casting after the pipe sections are assembled in proper alignment, while a rib 28 with inclined faces in the groove 27 makes it easier to calk the sealing ring. At the outer end of the spigot facing is a tapered rib 29 which serves to guide the spigot into the bell and also as a means for retaining a dam 30 of compressible waterproofed jute or the like. The dam 30 arrests the flow of molten metal from 27 but need not be relied upon as a tight gasket to stop the escape of liquid from the pipe, so that even though this gasket is made of material, such as rubber, which may lose its strength or resiliency after being exposed to fluids within the pipe, my joint will remain effective because the leadite or like material will not be subject to this type of deterioration. A protective covering 31 of burlap thoroughly soaked in asphalt or bitumastics which fills the circumferential groove 26, may be placed on the spigot prior to assembling the pipes to form a dam for the leadite when the sealing ring 27 is cast (see Figs. 1 and 9).

Figure 2:
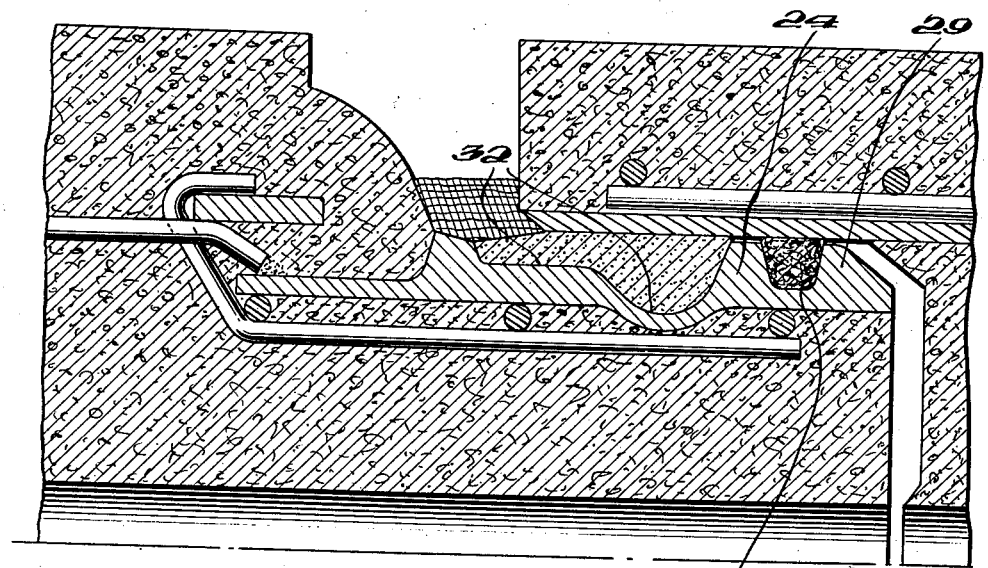
Figure 2 is an axial section of an alternative form of joint.

In Figure 2, an alternative form of sealing groove 32 is shown.

In Figure 3, the spigot facing is made with a terminal cylindrical split edge which forms tongues 33 which are bent back against a gasket 30, as shown at 34, to hold the latter in position and also to guide the spigot into the bell.

In Figures 4 and 5, the spigot facing has a terminal cylindrical portion 35 over which is fitted a concentric cylindrical ring 36 having an outer slope to guide the spigot and inner serrations or teeth 37 to engage a gasket 30. After the gasket and ring 36 are assembled, it may be spot welded to the spigot facing as at 38.

In Figures 6 and 7, the spigot facing is formed with a terminal cylindrical split edge having a rib 39 which is embedded in the gasket 30 when the tongues bearing said rib are bent back as shown in Figure 3. In this modification, there is also an intermediate rib 40 having a plurality of bearing lugs 41 which divides the sealing groove into two parts with connecting channels 42 which permit molten sealing metal to flow from the outer into the inner channel.

Figure 8:
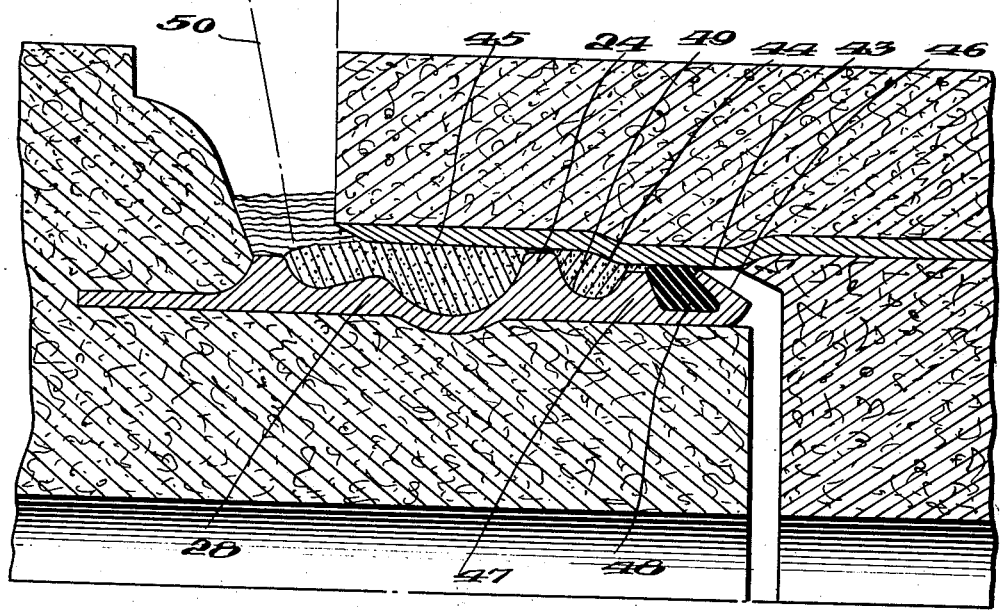
Figure 8 is an axial section of a further modification of my pipe joint in which a novel form of bell lining is used.

In the modification illustrated in Figure 8, the bell lining is forged inward to form an inner cylindrical portion 43 joined by a flaring portion 44 to an outer cylindrical portion 45, and the spigot facing is provided with a plurality of circumferential ribs of which 46 and 47 fit within the smaller portion 43 of the bell, while a third rib 24 fits within the larger portion and a fourth rib 28 with gradually sloping sides corresponds to that in preceding figures. Between the ribs 46 and 47, there is a groove in which a yielding packing 48, which may be waterproofed jute or rubber, is fitted while a groove 49 is formed between the ribs 24 and 47 in alignment with the flaring portion 44 of the bell and a part of the cylindrical lining 45 provides for expansion of the pipe and may be filled with a packing which may be a very cheap grade of jute, flax or the like. This modification allows the spigot freer entry through the outer end of the bell and reduces the chances of dislodging the packing while the spigot is being inserted in the bell. The packing in the groove 49 serves mainly to prevent molten lead or leadite flowing into and filling this space because it would be relatively rigid and would therefore interfere with the free expansion of the pipe sections.

Figure 9:
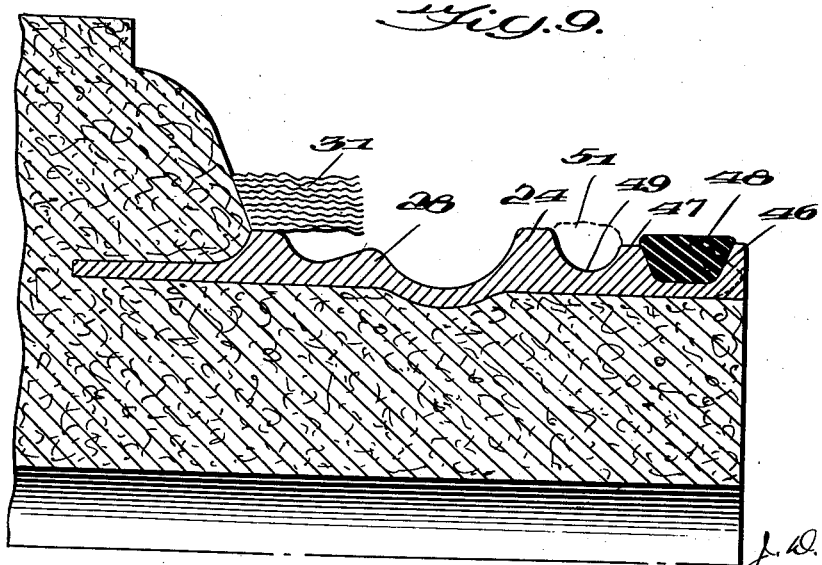
Figure 9 is an axial section of the spigot shown in Figure 8, with packing in place and prior to bending a terminal rib.

In Figure 9, the packing gaskets 48, 49 are shown on the spigot together with a protective covering gasket 31, all of which are compressed when the spigot is forced into a bell.

With the form of pipes shown in these drawings, an enlargement of the bell end of the pipes is avoided, so that in digging the trench it is not necessary to locate the position of each bell and dig a bell hole by hand, which tends to impair the uniform support of the pipe unless before back filling each bell hole is carefully tamped full of earth by hand. By eliminating this hand work, I save useless expense in pipe laying and make it possible to lay the pipes on a firmer foundation and more expeditiously.

The rib 46 may be initially radial, as shown in full lines in Figure 9, and after a packing gasket 48 has been placed in the groove this rib is bent to more positively hold the packing and provide a sloping face for the spigot (see Figs. 8 and 9). A temporary spout 50 (Fig. 8) provides a means for pouring the molten leadite and a second spout, not shown, is preferably used to provide a vent for escaping air and steam whereby the molten metal may be more quickly poured with less danger of the formation of holes in the casting.

With my joint the clearance between the bell 21 and rib 24 may be only about one-thirtieth of an inch, which forms a close push fit between the metal surfaces of the bell and spigot and assists in holding the packing in the grooves.

When the spigot is forced into the bell, both the packing ring 31 and the packing 51 in the groove 49 are compressed sufficiently to prevent a possible serious leakage of molten metal either into the trench or into the groove 49. By providing a spigot on which packing may be placed before the pipes are assembled it is possible for an inspector to accurately check each joint as the pipes are assembled.

While my joint is illustrated in a reinforced concrete pipe which may or may not have an internal watertight metal shell, it may also be applied to the joints of other pipes, such as cast iron and steel. Many other materials may be used for the packing gaskets, including lead wool rope, or lead wire. By excluding air and fluids containing air, I may use for some of my gaskets elastic material which would otherwise deteriorate in use due to oxidation. Water and dirt is excluded by my packings from the groove for the permanent seal which reduces the possibility of serious defects to a minimum.

The forms of pipe joints shown in my drawings and described above are illustrative and do not include various modifications which may be made within the scope of my invention.

What I claim is:

1. In a pipe joint, the combination with a bell having a smooth cylindrical bearing surface, a spigot having a circumferential rib adapted to form a continuous bearing against said bearing surface of said bell, means for retaining a dam of compressible waterproofed jute or the like against the face of the rib nearest the end of said spigot, and the spigot having a circumferential groove bounded on one side by the opposite face of said rib and externally accessible for calking from the end of a telescoping adjacent pipe section for receiving a permanent watertight seal of lead, leadite or the like.

2. In a pipe joint, the combination with a bell having a smooth cylindrical bearing surface, a spigot having a circumferential rib adapted to bear against said bearing surface of said bell, said spigot having a circumferential groove of varying depth bounded on one side by said rib with a deeper portion adjacent to said rib, and said spigot having a second groove between said rib and the end of said bell adapted to receive braided jute or the like to form a dam for molten lead, leadite or the like.

3. An expansion joint for pipes comprising a bell lining having a smooth cylindrical surface with a terminal outwardly flared portion, a spigot facing terminally inwardly tapered, provided with a circumferential groove for receiving braided jute or the like, a circumferential rib adapted to bear against said bell, said spigot facing having a second circumferential groove extending from said rib beyond the end of a telescoping bell and having a cross section of varying diameters with a shallower portion intermediate of its ends whereby a permanent seal of lead, leadite or the like is interlocked with said facing and is externally exposed for calking.

4. An expansion joint for pipes comprising a bell lining having a smooth cylindrical surface, a spigot facing having a terminally split edge adapted to be bent to form a means for holding a gasket, said spigot facing having a circumferential bearing rib, and having a circumferential groove of varying depth adapted to receive and secure against longitudinal displacement on said spigot a seal of lead, leadite or the like, said bell and spigot being shaped to leave a circumferential groove for exposing said sealing material for calking from the exterior of the pipe.

5. An expansion joint for pipes comprising a bell lining having an outer smooth cylindrical surface, an inner cylindrical surface of lesser diameter joined to said first portion by a flaring section, and a spigot facing provided with a plurality of circumferential ribs adapted to fit within corresponding portions of said bell and forming a plurality of grooves for sealing materials.

6. An expansion joint for pipes comprising a bell lining having an inner cylindrical portion, an outer cylindrical portion of greater diameter than said first portion and a flaring portion joining said cylindrical portions, a spigot facing provided with a plurality of circumferential ribs, two of which are adapted to fit within the smaller portion of said bell, a third rib adapted to fit within said larger portion of said bell and a fourth rib adjacent to the outer end of said bell of materially smaller diameter and having gradually sloping sides, whereby there are formed a groove for yielding packing bearing against said inner portion of said bell between said first ribs, a second groove for compressible packing between said second and third ribs in the flaring zone of said bell and a groove of varying depth for a permanent watertight seal of leadite or the like in which said fourth rib assists in anchoring said permanent seal and provides a sloping face against which calking pressure is assisted in forming a watertight joint.

7. An expansion joint for pipes comprising a bell having a smooth cylindrical face, a spigot having a circumferential rib adapted to hold said spigot and bell in alignment, said spigot having means for retaining a dam of packing against the face of the rib nearest the end of said spigot and having means cooperating with the rib for securing to said spigot a permanent watertight seal of leadite or the like.

8. In a pipe joint, the combination with a bell having a smooth cylindrical bearing surface, a spigot having a circumferential rib adapted to form a continuous bearing surface against the bearing surface of said bell, means for retaining a dam of compressible material against the face of the rib nearest the end of said spigot, said means comprising a ring separate from the spigot and secured thereto and having an edge bearing upon the dam, and the spigot having a circumferential groove bounded on one side by the opposite face of the rib and externally accessible for calking from the end of a telescoping adjacent pipe section for receiving a permanent watertight seal of lead, leadite, or the like.

JEFFERSON D. TRAMMELL.